(12) United States Patent
Gaboury et al.

(10) Patent No.: US 7,320,478 B2
(45) Date of Patent: Jan. 22, 2008

(54) SMART AIRBAG FOR VEHICULAR APPLICATIONS

(75) Inventors: Scott Gaboury, Ann Arbor, MI (US); David Tippy, Ann Arbor, MI (US); Ian Hall, Ann Arbor, MI (US); Mariquis Edwards, Belleville, MI (US)

(73) Assignee: Ford Global Technologies LLC, Dearborn, MI (US)

( * ) Notice: Subject to any disclaimer, the term of this patent is extended or adjusted under 35 U.S.C. 154(b) by 374 days.

(21) Appl. No.: 10/711,984

(22) Filed: Oct. 18, 2004

(65) Prior Publication Data

US 2006/0082110 A1  Apr. 20, 2006

(51) Int. Cl.
*B60R 21/16* (2006.01)
(52) U.S. Cl. .......................... 280/735; 701/45
(58) Field of Classification Search ................. 280/735; 701/45
See application file for complete search history.

(56) References Cited

U.S. PATENT DOCUMENTS

| | | | |
|---|---|---|---|
| 4,980,573 A | | 12/1990 | White et al. |
| 5,136,275 A | | 8/1992 | Madau et al. |
| 5,793,121 A | | 8/1998 | Burgess |
| 5,936,313 A | * | 8/1999 | Cook et al. ................. 307/10.1 |
| 6,166,184 A | * | 12/2000 | Hendriks et al. ............ 530/356 |
| 6,315,323 B1 | * | 11/2001 | Pack, Jr. ................... 280/743.2 |
| 6,517,108 B1 | * | 2/2003 | Vinton et al. ................ 280/739 |
| 6,597,181 B2 | | 7/2003 | Boran et al. |
| 6,733,036 B2 | | 5/2004 | Breed et al. |
| 6,789,819 B1 | * | 9/2004 | Husby ......................... 280/735 |
| 6,811,182 B2 | * | 11/2004 | Kobayashi et al. .......... 280/735 |
| 2002/0050826 A1 | | 5/2002 | Boran et al. |
| 2002/0175507 A1 | * | 11/2002 | Kobayashi et al. .......... 280/735 |
| 2003/0214308 A1 | * | 11/2003 | Condron et al. ............. 324/549 |
| 2004/0036261 A1 | | 2/2004 | Breed |
| 2004/0183290 A1 | * | 9/2004 | Hasebe et al. ............... 280/735 |

* cited by examiner

*Primary Examiner*—Eric Culbreth
*Assistant Examiner*—Joseph Rocca
(74) *Attorney, Agent, or Firm*—Frank MacKenzie; Dickinson Wright PLLC

(57) ABSTRACT

A smart airbag (14) is monitored by a vehicle restraint control module (24) and includes a state sensor (42) that generates an airbag state signal. A smart airbag fault circuit (40) is coupled to the state sensor (42) and includes multiple state devices (50). Each of the state devices (50) has a characteristic that is indicative of the state of the smart airbag (14). The state devices (50) are configured to be monitored by the vehicle restraint control module (24). A smart airbag state monitor (44) is separate from the vehicle restraint control module (24), is coupled to the state devices (50), and alters the state in response to the airbag state signal.

20 Claims, 1 Drawing Sheet

SMART AIRBAG FOR VEHICULAR APPLICATIONS

TECHNICAL FIELD

The present invention relates to vehicle safety restraint systems and more particularly, to a system and method of indicating diagnostic information related to a smart airbag.

BACKGROUND OF THE INVENTION

Restraints are utilized within automotive vehicles to prevent injury to vehicle occupants in the event of a collision. Various types of restraints are utilized, which may be active or passive in design. Some example active restraints are airbags, pretensioners, and load limiting seat belts. Some example passive restraints are seat belts, headrests, and energy absorbing material containing devices.

To satisfy various automobile safety requirements, such as the requirements under the Federal Motor Vehicle Safety Standard (FMVSS) 208, automobile manufacturers are required to include "Smart" airbag systems in their vehicles. Smart airbag systems refer to airbag systems that are capable of protecting occupants with different occupant characteristics, such as size, weight, and position within a vehicle seat. These requirements also require the prevention of airbag deployment when unwarranted. For example, it is undesirable to deploy an airbag into a rearward facing child seat or when a vehicle occupant is positioned too close to the airbag. To determine occupant characteristics, sensors, such as vehicle interior cameras and seat-based sensors, have been utilized. Such occupant characteristic sensors are considered impractical for certain applications and tend to complicate a restraint control circuit.

As an alternative to the use of occupant characteristic or classification sensors, airbag internal sensors are currently being introduced for determining the state of an airbag including the deployment characteristics thereof. Occupant characteristic information can be obtained or derived from the deployment characteristics. For example, by monitoring the deployed pressure of an airbag one can determine whether the airbag has collided with an object, such as a child seat. When the airbag collides with the child seat an uncharacteristical deployment pressure transient results as compared to a normal deployment defined as when the airbag is deployed without object intervention. A restraint controller may react in response to the uncharacteristical transient to prevent further expansion of the airbag.

Airbags with internal sensors are considered smart airbags. Smart airbags are distinguishable from smart airbag systems. Smart airbags are capable of determining a current state of an airbag whereas smart airbag systems are capable of altering the manner in which an airbag is deployed, depending on occupant determined characteristics.

There is a desire for traditional style airbags to be replaced with smart airbags and in addition that the introduction of the smart airbags not require changes to the traditional style restraint control systems or to the logic of any restraint controllers therein. It is also desired that upon the introduction of the smart airbags that existing restraint controllers be capable of determining when a fault exists with the smart airbag. A fault may include a static physical fault, such as one with a connector, a wire, and a trigger, as well as a dynamic physical fault, such as an uncharacteristical deployment condition.

Thus, there exists a need for a smart airbag that may be utilized in replacement of a traditional style airbag that does not require alteration to a corresponding restraint control system and that provides an indication to a restraint controller when a fault exists.

SUMMARY OF THE INVENTION

The present invention provides a smart airbag that is monitored by a vehicle restraint control module. The smart airbag includes a state sensor that generates an airbag state signal. A smart airbag fault circuit is coupled to the state sensor and includes multiple state devices. Each of the state devices has a characteristic that is indicative of the state of the smart airbag. The state devices are configured to be monitored by the vehicle restraint control module. A smart airbag state monitor is separate from the vehicle restraint control module, is coupled to the state devices, and alters the state in response to the airbag state signal.

The embodiments of the present invention provide several advantages. One such advantage is the provision of a smart airbag that is capable of within and of itself detecting a fault therein including an uncharacteristic deployment transient.

Another advantage provided by an embodiment of the present invention is the provision of a smart airbag that may be used in replacement of traditional airbags within traditional restraint control systems and smart airbag systems without the reconfiguring or reprogramming of the stated systems.

Yet another advantage provided by an embodiment of the present invention is the provision of allowing a restraint controller to detect a fault within the smart airbag without communication between the smart airbag and the restraint controller. In addition, the present invention prevents the deployment or further expansion of the airbag when a fault exists as appropriate.

The present invention itself, together with attendant advantages, will be best understood by reference to the following detailed description, taken in conjunction with the accompanying figures.

BRIEF DESCRIPTION OF THE DRAWINGS

For a more complete understanding of this invention reference should now be made to embodiments illustrated in greater detail in the accompanying figures and described below by way of examples of the invention wherein.

DETAILED DESCRIPTION

Figure 1:
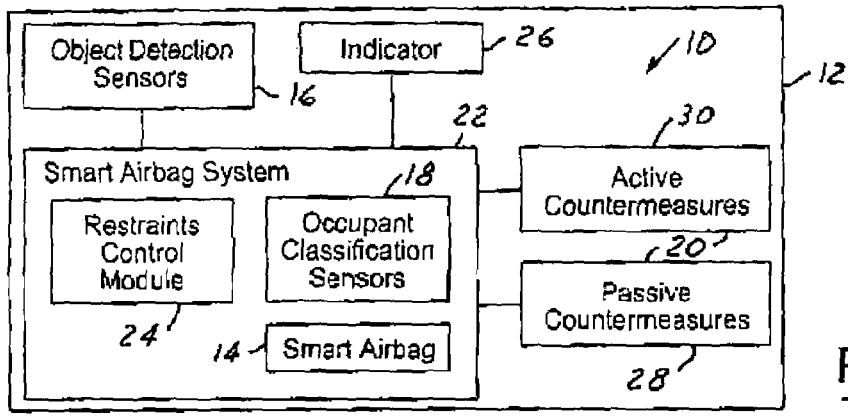
FIG. 1 is a block diagrammatic view of a collision warning and countermeasure system incorporating a smart airbag in accordance with an embodiment of the present invention.

In the following figures, the same reference numerals will be used to refer to the same components. While the present invention is described with respect to a system and method of indicating diagnostic information related to a smart airbag, the present invention may be adapted to be used in various applications and systems including: collision warning systems, collision avoidance systems, parking-aid systems, reversing-aid systems, passive countermeasure systems, adaptive cruise control systems, lane departure systems, lane-keeping systems, windshield clearing systems, or other systems known in the art. The present invention may be used to supplement a pre-collision sensing system.

In the following description, various operating parameters and components are described for multiple constructed embodiments. These specific parameters and components are included as examples and are not meant to be limiting.

Additionally, in the following description, the term "performing" may include activating, deploying, initiating, powering, and other terms known in the art that may describe the manner in which a countermeasure or a comfort and convenience feature may be operated.

As well, in the following description, various countermeasures are discussed. The countermeasures may be reversible or irreversible. Reversible countermeasures refer to countermeasures that may be reset to their original form or used repeatedly without a significant amount of functional deficiency, which may be determined by a system designer. Irreversible countermeasures refer to countermeasures such as airbags that, once deployed, are not reusable.

Furthermore, a countermeasure signal may include information pertaining to the above-stated reversible and irreversible countermeasures or may include other information, such as collision warning information, and parking-aid or reversing-aid countermeasure information. For example, the countermeasure signal may contain object detection information, which may be used to indicate to a vehicle operator the presence or close proximity of a detected object.

In addition, the term "object" may refer to any animate or inanimate object. An object may be a vehicle, a pedestrian, a lane marker, a road sign, a roadway lane designating line, a vehicle occupant, window moisture, or other object known in the art.

Referring now to FIG. 1, a block diagrammatic view of a collision warning and countermeasure system 10 for a vehicle 12 incorporating a smart airbag 14 in accordance with an embodiment of the present invention is shown. The countermeasure system 10 includes object detection sensors 16, occupant classification sensors 18, countermeasures 20, and a smart airbag system 22. The countermeasure system 10 detects objects within proximity of the vehicle 12 and any collision therewith via the object detection sensors 16. The countermeasure system 10 detects occupant characteristics of occupants within the vehicle 12 via the occupant classification sensors 18. The countermeasure system 10 in response to the threat of the detected objects and the occupant characteristics may perform one or more of the countermeasures 20.

Figure 2:
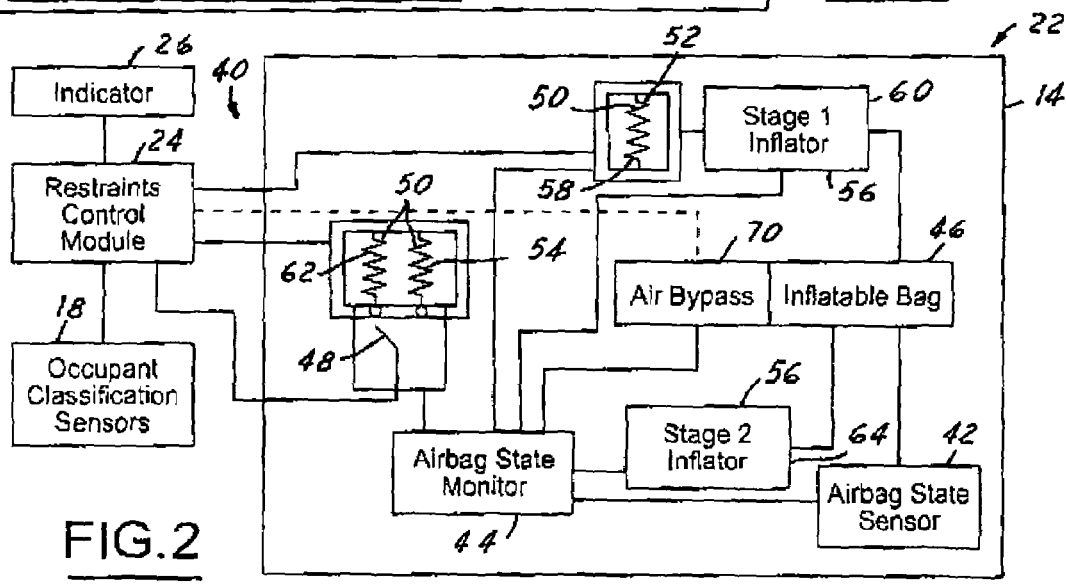
FIG. 2 is a block diagrammatic and schematic view of a restraint control circuit incorporating the smart airbag in accordance with an embodiment of the present invention.

In performing the countermeasure 20, the smart airbag system 22 may include (as shown in FIG. 2) and be utilized to activate the smart airbag 14 in response to a collision or potential collision with one or more of the detected objects. The smart airbag 14 includes circuitry, which allows a restraint control module 24 to detect when a fault exists with the smart airbag 14. The circuitry is shown and described in detail with respect to the embodiment of FIG. 2. The restraint control module 24 may indicate the fault via the indicator 26. The restraint control module 24 may refrain from activating the smart airbag 14 depending upon any faults existing with the smart airbag 14 and the occupant characteristics.

The object detection sensors 16 monitor an environment exterior to the vehicle 12 and generate object detection signals upon detection of an object. The occupant classification sensors 18 monitor interior areas of the vehicle 12 and generate occupant classification signals in response to the presence and characteristics of occupants therein. The occupant characteristics may include occupant positioning within a seat, occupant size, shape, weight, whether a seat belt is utilized, or other known occupant characteristics. The occupant classification sensors 18 may also detect whether a child safety seat is located within a passenger seat of the vehicle 12.

The object detection sensors 16 and the occupant classification sensors 18 may be infrared, vision, ultrasonic, radar, or lidar based or may be in the form of an accelerometer, a piezo electric sensor, a piezo resistive sensor, a charged-coupled device, a series of photodiodes, or in some other form known in the art. The object detection sensors may sense characteristics of an environment external to the vehicle or internal to the vehicle. For example radar sensors may be used to detect an external environment whereas accelerometers may be used to detect an internal environment. The object detection sensors 16 and the occupant classification sensors 18 may also be in the form of a pressure sensor or a strain gage. The object detection sensors 16 and the occupant classification sensors 18 may be in various locations on the vehicle.

The countermeasures 20 include passive countermeasures 28 and active countermeasures 30. The passive countermeasures 28 may include internal air bag control, seatbelt control, knee bolster control, head restraint control, load limiting pedal control, load limiting steering control, pretensioner control, external air bag control, pedestrian protection control, and other passive countermeasures known in the art. The passive countermeasures 28 may also include position control of a steering wheel, seat assembly, seat back, seat cushion, head restraint, and other related components.

The active countermeasures 30 may include brake control, throttle control, steering control, suspension control, transmission control, and other vehicle control systems. The restraint control module 24 may signal the vehicle operator via the indicator of an impending potential collision so that the vehicle operator may actively perform a precautionary action, such as applying the brakes or steering to prevent a collision.

The restraint control module 24 may perform various sensing system and countermeasure operations in response to the object detection signals and occupant classification signals. The restraint control module 24 may enable various passive countermeasures and active countermeasures in response to the object detection signals. The restraint control module 24 as part of a countermeasure may generate a warning signal and communicate the warning signal to vehicle occupants via the indicator.

The restraint control module 24 may be microprocessor based such as a computer having a central processing unit, memory (RAM and/or ROM), and associated input and output buses. The restraint control module 24 may be an application-specific integrated circuit or be formed of other logic devices known in the art. The restraint control module 24 may be a portion of a central vehicle main control unit, an interactive vehicle dynamics module, a main safety controller, or may be a stand-alone controller as shown.

The restraint control module 24 may perform various different sensing system operations including adaptive cruise control, lane-keeping control, lane-departure control, window clearing control, collision avoidance control, countermeasure control, or other sensing system operations known in the art. The operations may be performed sequentially or simultaneously.

The restraint control module 24 determines which of the sensing system operations to perform. The restraint control module 24 while performing one or more of the sensing system operations may determine whether to perform one or more of the countermeasures 20 and indicate to the vehicle operator various object and vehicle status information. Depending upon relative positions, velocities, and accelerations of the detected objects, the restraint control module may also determine whether to indicate to the vehicle operator of a potential collision or may perform a countermeasure, as needed, so as to prevent a collision, mitigate a potential injury, or prevent the vehicle 12 from traveling outside a current lane of travel.

The indicator 26 is used to signal or indicate a safety system signal, which may include a calibration signal, an occupant classification sensor related signal, a warning signal, a collision-warning signal, a countermeasure signal, or an object identification signal in response to the object detection signals. The indicator 26 may include a video system, an audio system, an LED, a light, a global positioning system, a heads-up display, a headlight, a taillight, a display system, a telematic system, or other indicator known in the art. The indicator 26 may supply warning signals, collision-related information, lane departure and lane-keeping information, external-warning signals to objects or pedestrians located outside of the vehicle 12, or other pre and post collision information. The warning signals may be radio frequency based or based on some other technique known in the art.

Referring now to FIG. 2, a block diagrammatic and schematic view of the smart airbag system 22, which is in the form of a restraint control circuit, incorporating the smart airbag 14 in accordance with an embodiment of the present invention is shown. The smart airbag system 22 includes an airbag module internal state circuit 40 having the restraint control module 24 and the smart airbag 14. The restraint control module 24 continuously monitors the state of the smart airbag 14, indicates when a fault exists via the indicator 26, and prevents deployment of or further expansion of the smart airbag 14 when appropriate.

The smart airbag 14 includes airbag state sensors 42 and an airbag state monitor 44. The state sensors 42 determine the current state of the inflatable bag 46 and in response thereto the airbag state monitor 44 alters the monitored state of the smart airbag 14 as detected by the restraint control module 24.

The airbag state monitor 44 alters monitored state of the inflatable bag 46 via a fault switch 48, which is coupled to multiple state devices 50. The state devices 50 include igniters or trigger devices 52 and a fault trigger substitute 54. The trigger devices 52 are coupled to the restraint control module 24 and to inflators 56 for deployment of an inflatable bag 46. The trigger devices 52 are used as state devices. The trigger devices 52 include a first trigger device 58 that is coupled to a first stage inflator 60 and a second trigger device 62, which is coupled to a second stage inflator 64. The second trigger device 62 is coupled in parallel with the fault trigger substitute 54. The state devices 50 have a characteristic, such as resistance, that is monitored by the restraint control module. The trigger devices 52, in the example embodiment shown, have a first corresponding resistance value, which is monitored by the restraints control module 24. The fault trigger substitute 54 has a different resistance than the second trigger device 62. This difference in resistance can be detected by the restraint control module 24 and from which the restraint control module 24 can determine that a fault exists with the smart airbag 14. The airbag state monitor 44 selects either the second trigger device 62 or the fault trigger substitute 54 depending upon the state of the inflatable bag 46.

The airbag sensors 42 generate airbag state signals in response to the expansion of the inflatable bag 14 and may indicate other airbag characteristics known in the art. The airbag sensors 42 may be of various types and styles known in the art. As an example, the airbag sensors 42 may include airbag internal pressure sensors (not shown) for monitoring the internal pressure of the inflatable bag 46. As another example, the airbag sensors 42 may include a barcode type reader (not shown) for monitoring the payout of a tether (not shown), a ticker tape, or the like attached to the inflatable bag 46, the amount of payout of the tether indicating the expansion of the inflatable bag 46.

The airbag state monitor 44 is located within the smart airbag 14 and is separate from the restraints control module 24. The airbag state monitor 44, like the restraints control module 24, may be microprocessor based such as a computer having a central processing unit, memory (RAM and/or ROM), and associated input and output buses. The airbag state monitor 44 may be an application-specific integrated circuit or be formed of other logic devices known in the art.

The state devices 50 may be in the form of resistors. In one embodiment of the present invention, each of the first trigger device 58 and the second trigger device 62 have a resistance of approximately 2 Ohms, whereas the fault trigger substitute 54 has a resistance value that is less than or greater than 2 Ohms. The resistance value of the fault trigger substitute 54 is such that the restraints control module 24 can detect that the fault trigger substitute 54 is selected and not the second trigger device 62.

The inflators 56 and the inflatable bag 46 may be of various types and styles known in the art. The inflators 56 are used to inflate the inflatable bag 46 at different rates, to different expanded volumes, and at different forces, depending upon the occupant characteristics. The inflators 56 may be used sequentially, synchronously, or simultaneously.

Although the airbag state monitor 44 is shown as being coupled to and monitoring the second trigger device 62, the airbag state monitor 44 may be similarly coupled to the first trigger device 58. Also, although two stages are shown, any number of airbag stages may be utilized. The smart airbag 14 may be easily modified to accommodate for additional stages and the internal monitoring of each additional stage.

The smart airbag also includes an air bypass 70 that is coupled to the inflatable bag 46. The air bypass 70 allows the restraints control module 24 and/or the airbag state monitor 44 to release air within or prevent air from entering the inflatable bag 46 when further inflation of the inflatable bag 46 is undesired or deflation is desired.

Figure 3:
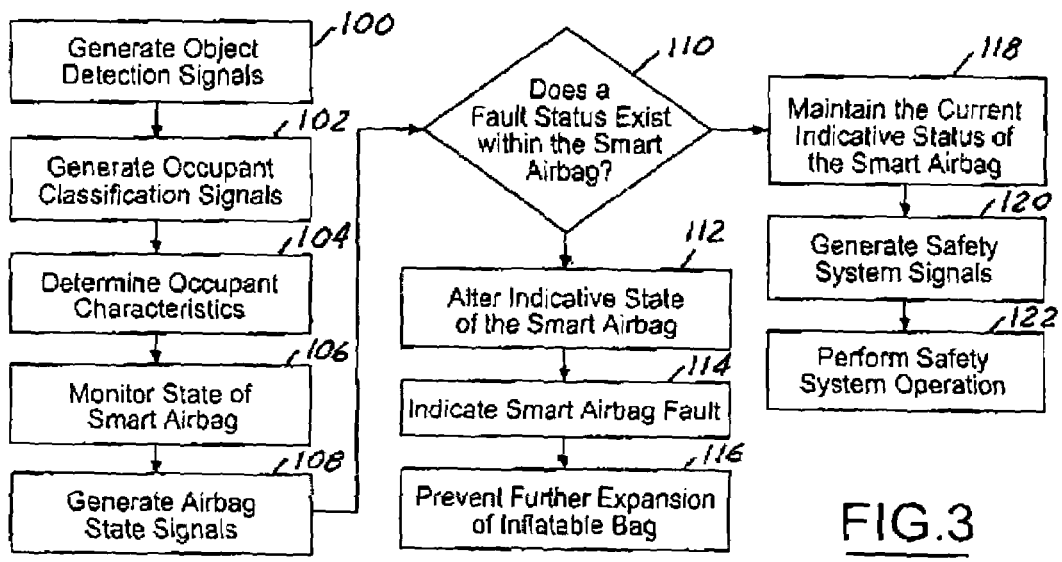
FIG. 3 is a logic flow diagram illustrating a method of indicating a state of an airbag in accordance with an embodiment of the present invention.

Referring now to FIG. 3, a logic flow diagram illustrating a method of indicating a state of an airbag in accordance with an embodiment of the present invention is shown.

In step 100, the collision detection sensors 16 generate multiple object detection signals corresponding to the detection of objects within areas external to the vehicle 12. In step 102, the occupant classification sensors 18 generate occupant classification signals that include occupant characteristic related information.

In step 104, the restraint control module 24 may determine occupant characteristics, such as size, weight, height, occupant position, and seat position, as well as whether a seat belt is utilized or whether a child safety seat is located in front or within range of an airbag. The occupant characteristics are determined in response to the occupant classification signals.

In step 106, the restraint control module 24 monitors the state of the smart airbag 14. Although associated with a particular step the restraint control module 24 continuously monitors that state of the smart airbag 14. In one embodiment, the restraints control module 24 monitors the resistance of the state devices 50 that are coupled to the restraints control module 24.

In step 108, the airbag state sensors 42 generate airbag state signals. The airbag state signals include state related information as described above.

In step 110, the airbag state monitor 44 determines whether a fault exists within the smart airbag 14 in response to the airbag state signals. When the resistance of the state devices 50 changes or becomes different than associated predetermined values the restraint control module 24 determines that a fault exists with the smart airbag 14. For example, when the restraint control module 24 measures the resistance of the second state device 62 and the resistance is less than or greater than approximately 2 Ohms a fault is indicated via the indicator 26. A fault may include a static physical fault, which may be mechanical or electrical, such as a short to ground within a connector or wire. A fault may also include a dynamic physical fault, such as the inflatable bag 46 colliding with a child safety seat or other object, before the inflatable bag 46 is fully inflated.

In step 112, when a fault does exist the airbag state monitor 44 alters the indicative state of the smart airbag 14 to the restraint control module 24 by selecting or switching the coupling of the restraint control module 14 from the second trigger device 62 to the fault trigger substitute 54. In step 114, the restraints control module 24 detects the coupling and the resistance of the fault trigger substitute 54, generates an airbag fault signal, and indicates the fault via the indicator 26. In step 116, the restraint control module 24 and/or the airbag state monitor 44 prevent the deployment of or further expansion of the inflatable bag 46. When a fault is detected, during the deployment of the inflatable bag 46, the restraints control module 24 and/or the airbag state monitor 44 activate the air bypass 70 to allow air within the inflatable bag 46 to escape or be released therefrom.

In step 118, when a fault does not exist the airbag state monitor 44 maintains the selection of the second trigger device 62.

In step 120, the restraint control module 24 generates multiple safety system signals in response to the object detection signals and the occupant classification signals. The safety system signals may include countermeasures related signals and other sensing system control signals.

In step 122, the restraints control module 24 may perform multiple sensing system operations in response to the safety system signals. As an example, the occupant classification sensors 16 may detect an occupant that is small in size or a child safety seat within a seat system and decelerate or prevent the activation of an inflatable bag 46 near the occupant or safety seat.

The above-described steps are meant to be illustrative examples; the steps may be performed sequentially, synchronously, simultaneously, or in a different order depending upon the application.

The present invention provides a smart airbag that may be used in replacement of traditional style airbags without need for the altering of a restraint control circuit. The smart airbag is capable of altering monitored state of the airbag with respect to a restraint control module such that the restraint control module can then determine that a fault exists and perform appropriate tasks as a result.

While the invention has been described in connection with one or more embodiments, it is to be understood that the specific mechanisms and techniques which have been described are merely illustrative of the principles of the invention, numerous modifications may be made to the methods and apparatus described without departing from the spirit and scope of the invention as defined by the appended claims.

What is claimed is:

1. A smart airbag for being deployed and monitored by a restraint control module onboard a vehicle, said smart airbag comprising:

an inflatable bag having a monitorable deployment characteristic;

a triggerable inflator for deploying said bag;

a trigger device adapted for being coupled to said restraint control module and said inflator, said trigger device having a predetermined circuit characteristic associated therewith;

a trigger substitute adapted for being coupled to said restraint control module, said trigger substitute having a predetermined circuit characteristic associated therewith that is detectably different than said predetermined circuit characteristic associated with said trigger device;

an airbag-state sensor for sensing said deployment characteristic of said bag and generating an airbag-state signal in response thereto; and an airbag-state monitor coupled to said airbag-state sensor and adapted for selectively coupling a trigger to said restraint control module according to said airbag-state signal, said trigger being selected from the group consisting of said trigger device and said trigger substitute;

whereby said restraint control module is able to initiate deployment of said bag and also monitor said deployment of said bag by detecting said predetermined circuit characteristic of said trigger as selectively coupled to said restraint control module by said airbag-state monitor.

2. A smart airbag according to claim 1, wherein said deployment characteristic of said bag is internal pressure, and said airbag-state sensor includes an internal-pressure sensor by which said internal pressure of said bag is able to be monitored.

3. A smart airbag according to claim 1, wherein said deployment characteristic of said bag is degree of expansion, and said airbag-state sensor includes both a tether attached to said bag and a barcode-type reader for determining the payout of said tether by which said degree of expansion of said bag is able to be monitored.

4. A smart airbag according to claim 1, wherein said smart airbag further comprises:

an additional inflator for deploying said bag; and an additional trigger device adapted for being coupled to said restraint control module and said additional inflator.

5. A smart airbag according to claim 1, wherein said trigger device is an igniter.

6. A smart airbag according to claim 1, wherein said trigger substitute is also adapted for being coupled to said inflator.

7. A smart airbag according to claim 1, wherein said trigger device and said trigger substitute are selectively coupled in parallel with each other.

8. A smart airbag according to claim 1, wherein said trigger device and said trigger substitute each include at least one resistor, and said predetermined circuit characteristic associated with both said trigger device and said trigger substitute is resistance.

9. A smart airbag according to claim 8, wherein said predetermined circuit characteristic of said trigger device has a resistance value of approximately 2 ohms, and said predetermined circuit characteristic of said trigger substitute has a resistance value that is detectably different than said resistance value of said trigger device.

10. A smart airbag according to claim 1, wherein said predetermined circuit characteristic associated with said trigger device serves to indicate that a fault has not occurred during said deployment of said bag when detected by said restraint control module, and said predetermined circuit characteristic associated with said trigger substitute serves to indicate that a fault has occurred during said deployment of said bag when detected by said restraint control module.

11. A smart airbag according to claim 1, wherein said smart airbag includes a switch adapted for coupling said restraint control module to one of said trigger device and said trigger substitute as selectively controlled by said airbag-state module according to said airbag-state signal.

12. A smart airbag according to claim 1, wherein said airbag-state monitor is also coupled to said inflator for selectively controlling said inflator according to said airbag-state signal.

13. A smart airbag according to claim 1, wherein said airbag-state monitor is also coupled to said trigger device for selectively controlling said trigger device according to said airbag-state signal.

14. A smart airbag according to claim 1, wherein said smart airbag further comprises an air bypass coupled to said bag and adapted for regulating the amount of air within said bag as selectively controlled by at least one of said restraint control module and said airbag-state monitor according to said airbag-state signal.

15. A smart airbag for being deployed and monitored by a restraint control module onboard a vehicle, said smart airbag comprising:
an inflatable bag having at least one monitorable deployment characteristic;
a plurality of triggerable inflators for deploying said bag;
a matching plurality of trigger devices adapted for being coupled to said restraint control module and said inflators respectively, at least one of said trigger devices having a predetermined circuit characteristic associated therewith;
at least one trigger substitute adapted for being coupled to said restraint control module, each said trigger substitute having a predetermined circuit characteristic associated therewith that is detectably different than each said predetermined circuit characteristic associated with any of said trigger devices;
at least one airbag-state sensor for respectively sensing each said deployment characteristic of said bag and respectively generating at least one airbag-state signal in response thereto; and
an airbag-state monitor coupled to each said airbag-state sensor and adapted for selectively coupling at least one trigger to said restraint control module according to each said airbag-state signal, each said trigger being selected from the group consisting of each of said trigger devices having a predetermined circuit characteristic associated therewith and each said trigger substitute having a predetermined circuit characteristic associated therewith;
whereby said restraint control module is able to initiate deployment of said bag and also monitor said deployment of said bag by detecting each said predetermined circuit characteristic of each said trigger as selectively coupled to said restraint control module by said airbag-state monitor.

16. A smart airbag according to claim 15, wherein at least one said monitorable deployment characteristic of said bag is selected from the group consisting of internal pressure and degree of expansion.

17. A smart airbag according to claim 15, wherein each of said trigger devices having a predetermined circuit characteristic associated therewith and each said trigger substitute having a predetermined circuit characteristic associated therewith includes at least one resistor, and each said predetermined circuit characteristic associated with any of said trigger devices and each said predetermined circuit characteristic associated with each said trigger substitute is resistance.

18. A smart airbag according to claim 15, wherein said smart airbag further comprises an air bypass coupled to said bag and adapted for regulating the amount of air within said bag as selectively controlled by at least one of said restraint control module and said airbag-state monitor according to each said airbag-state signal.

19. A method for deploying and monitoring a smart airbag with a restraint control module onboard a vehicle, said method comprising the steps of:
operating a trigger device in response to said restraint control module to initiate deployment of an inflatable bag with a triggerable inflator;
operating an airbag-state sensor to sense a monitorable deployment characteristic of said bag and accordingly generate an airbag-state signal;
operating an airbag-state monitor in response to said airbag-state signal to determine whether a fault has occurred during said deployment of said bag;
operating said airbag-state monitor to selectively couple said trigger device to said restraint control module when no fault is determined to have occurred, said trigger device having a predetermined circuit characteristic associated therewith that is detectable by said restraint control module; and
operating said airbag-state monitor to selectively couple a trigger substitute to said restraint control module when a fault is determined to have occurred, said trigger substitute having a predetermined circuit characteristic associated therewith that is detectable by said restraint control module and also detectably different than said predetermined circuit characteristic associated with said trigger device.

20. A method according to claim 19, wherein said method further comprises the step of:
operating an air bypass to regulate the amount of air within said bag as selectively controlled by at least one of said restraint control module and said airbag-state monitor according to said airbag-state signal.

* * * * *